(12) United States Patent
Star-Lack et al.

(10) Patent No.: US 8,903,150 B2
(45) Date of Patent: Dec. 2, 2014

(54) FILTRATION IMAGING ENHANCEMENT METHOD AND SYSTEM

(75) Inventors: Josh Star-Lack, Palo Alto, CA (US); Mingshan Sun, Menlo Park, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 474 days.

(21) Appl. No.: 13/194,957

(22) Filed: Jul. 31, 2011

(65) Prior Publication Data

US 2013/0028495 A1 Jan. 31, 2013

(51) Int. Cl.
*G06K 9/00* (2006.01)
*G06T 11/00* (2006.01)

(52) U.S. Cl.
CPC ......... *G06T 11/005* (2013.01); *G06T 2211/412* (2013.01)
USPC ........................................................ 382/131

(58) Field of Classification Search
USPC ............................ 382/128–132, 275; 600/434
See application file for complete search history.

(56) References Cited

U.S. PATENT DOCUMENTS

| | | | |
|---|---|---|---|
| 6,539,074 B1 | 3/2003 | Yavuz et al. | |
| 2004/0234115 A1 | 11/2004 | Zijp et al. | |
| 2006/0133564 A1 | 6/2006 | Langan et al. | |
| 2006/0245536 A1 | 11/2006 | Boing et al. | |
| 2006/0262895 A1 | 11/2006 | Kawachi et al. | |
| 2007/0167707 A1 | 7/2007 | Mistretta et al. | |
| 2008/0219535 A1 | 9/2008 | Mistretta et al. | |
| 2010/0021033 A1 | 1/2010 | Bruder et al. | |
| 2010/0195931 A1 | 8/2010 | Teshigaqwara et al. | |
| 2011/0044559 A1* | 2/2011 | Erhard et al. ............. | 382/275 |
| 2011/0081068 A1 | 4/2011 | Brinks et al. | |
| 2012/0275657 A1 | 11/2012 | Kolthammer et al. | |
| 2012/0275673 A1 | 11/2012 | Star-Lack et al. | |
| 2012/0314921 A1 | 12/2012 | Star-Lack et al. | |

FOREIGN PATENT DOCUMENTS

WO 2009136347 A1 11/2009

OTHER PUBLICATIONS

Ziyi Zheng et al., ("Fast 4D Cone-Beam Reconstruction Using the McKinnon-Bates Algorithm with Truncation Correction and Non Linear Filtering," Proc. SPIE 7961,79612U, Mar. 2011).*
Shuai et al, ("Streaking artifacts reduction in four-dimensional cone-beam computed tomography," Med. Phys., Oct. 2008, 4649-4659, vol. 35, No. 10, Am. Assoc. Phys. Med).*
Adrian et al ("Biased motion-adaptive temporal filtering for speckle reduction in echocardiography", IEEE transactions on medical imaging, vol. 15, No. 1, Feb. 1996).*

(Continued)

*Primary Examiner* — Amara Abdi
(74) *Attorney, Agent, or Firm* — SU IP Consulting (57) ABSTRACT

In accordance with at least some embodiments of the present disclosure, a process for enhancing a motion-blurred image is presented. The process may include obtaining a prior image based on a plurality of projections, wherein the plurality of projections are computed tomography (CT) images obtained in multiple motion phases. The process may further include performing an enhancement operation based on the prior image to generate an enhanced prior image, generating a plurality of re-projections by forward-projecting the enhanced prior image, generating a plurality of phase-correlated difference images based on the plurality of projections and the plurality of re-projections, filtering the plurality of phase-correlated difference images to generate a plurality of filtered phase-correlated difference images, and generating a plurality of phase-correlated images based on the plurality of filtered phase-correlated difference images and the enhanced prior image.

19 Claims, 5 Drawing Sheets

(56) References Cited

OTHER PUBLICATIONS

Shuai Leng et al., "Streaking artifacts reduction in four-dimensional cone-beam computed tomography," Med. Phys., Oct. 2008, 4649-4659, vol. 35, No. 10, Am. Assoc. Phys. Med.

Graeme C. Mc Kinnon et al., "Towards Imaging the Beating Heart Usefully with a Conventional CT Scanner," IEEE Transactions on Biomedical Engineering, Feb. 1981, 123-127, vol. BME-28.

Kathryn L. Garden et al., "3-D Reconstruction of the Heart from few Projections: A Practical Implementation of the McKinnon-Bates Algorithm," IEEE Transactions on Medical Imaging, Dec. 1986, 233-239, vol. MI-5, No. 4.

Ziyi Zheng et al., "Fast 4D Cone-Beam Reconstruction Using the McKinnon-Bates Algorithm with Truncation Correction and Non Linear Filtering," Proc. SPIE 7961, 79612U, Mar. 2011.

Notification of Transmittal of the International Search Report and the Written Opinion of the International Searching Authority, International Application No. PCT/US12/40654, Oct. 22, 2012.

S Mazin et al., "Metal Artifact Reduction Algorithm for X-Ray CT Using a Three-Pass Approach", Medical Physics, Jun. 2009, p. 2432 (See Su-EE-A4-03), vol. 36, No. 6.

* cited by examiner

Fig. 5

FILTRATION IMAGING ENHANCEMENT METHOD AND SYSTEM

BACKGROUND OF THE DISCLOSURE

1. Field of the Disclosure

Embodiments of the present disclosure relate generally to image processing technologies and more specifically to filtration imaging enhancement methods and systems.

2. Description of the Related Art

Unless otherwise indicated herein, the approaches described in this section are not prior art to the claims in this application and are not admitted to be prior art by inclusion in this section.

Computed tomography (CT) has been a widely used imaging technique. However, when a CT medical imaging device takes an insufficient number of samples, aliasing artifacts such as streaks may appear in the reconstructed images. Cone-beam computed tomography (CBCT), which involves the use of wide area detectors, is more susceptible to undersampling problems because data frame rates are slower.

One challenge for medical cone-beam computed tomography is to manage respiratory motion. Due to the relatively slow gantry rotation times, it is very difficult to acquire a full CBCT data set in a single breath hold, much less in a single respiratory phase (e.g., inspiration or expiration). However, because motion is periodic, a 4-D image (3 spatial dimensions and 1 time dimension) can be obtained by grouping the acquired CBCT projections by respiratory phase and reconstructing a distinct 3-D image for each phase. In many cases, due to the sparse or "wagon-wheel" projection sampling distributions associated with each respiratory phase, aliasing artifacts, including streaks emanating from bones, are often introduced. While it is possible to reduce these artifacts by slowing down the gantry rotation rate thus reducing the distance between adjacent wagon-wheel spokes, there are substantial costs associated with lengthening the imaging times and delivering higher doses of radioactive X-rays.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Throughout the disclosure, the terms "image" and "reconstructed image" are used interchangeably to broadly refer to a set of data that graphically represents a physical object or a person. For example, a 3D image of a patient's heart may be reconstructed based on a set of 2D x-ray projections taken through the heart and its surrounding anatomy by a medical imaging device. Similarly, by processing a set of sinograms associated with a section of a patient's body, a cross-section image of the patient's body may be generated.

Throughout the disclosure, the term "multi-phase" may broadly refer to multiple motion phases (e.g., respiratory phases such as inspiration and expiration, cardiovascular phases such as diastole and systole, muscular phases such as concentric contraction and eccentric contraction, and others). The term "phase-correlated" may broadly characterize data that are organized based on the multiple motion phases. For example, a set of phase-correlated images may be sorted based on the number of respiratory phases and/or the sequence in which the respiratory phases occur. Alternatively, the phase-correlated images may be sorted based on the types of respiratory phases. That is, one of the phase-correlated images may be associated with all the inspiration phases, while another one of the phase-correlated images being associated with all the expiration phases.

Figure 1:
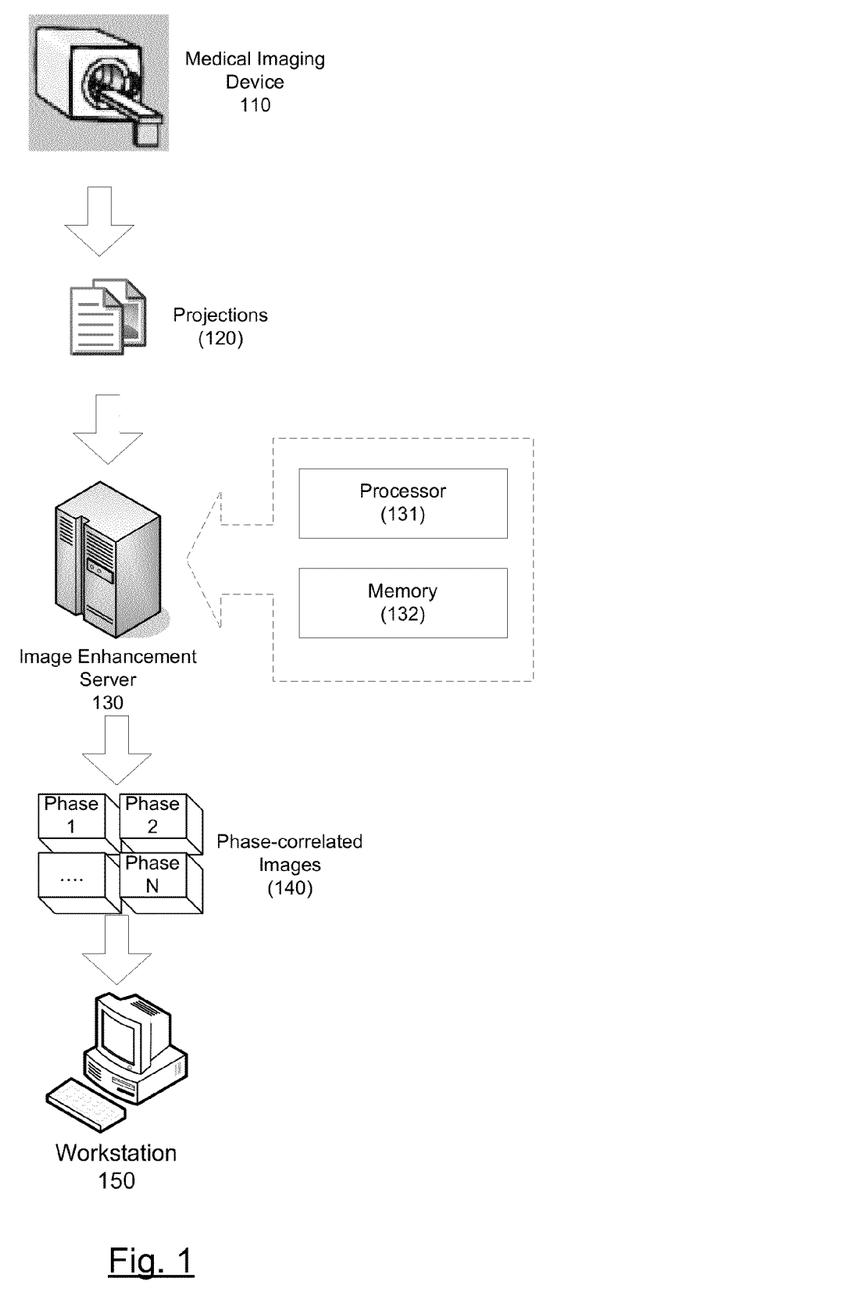
FIG. 1 shows a block diagram illustrating one embodiment of a system configured to enhance an image.

FIG. 1 shows a block diagram illustrating one embodiment of a system configured to enhance an image. In particular, one or more medical imaging devices 110 may generate projections 120, which an image enhancement server 130 may process in order to generate a set of phase-correlated images 140. The phase-correlated images 140 may then be transmitted to one or more workstations 150 for display and further processing.

Some examples of the medical imaging device 110 may include, without limitation, an X-ray device, CT device, Magnetic Resonance Imaging device, and others. The medical imaging device 110 may have one or more detectors that can detect signals from various angles and distances.

In some embodiments, the image enhancement server 130 may perform one or more image enhancing operations to the projections 120 so that artifacts in the phase-correlated images 140 may be reduced. An example image enhancement server 130 may include one or more processors 131, memory 132, and/or other components, so that it could process the projections 120. Similarly, an example workstation 150 may also include one or more processors, memory, and/or other components (not shown), so that it could process the phase-correlated images 140. It should be apparent to a person having ordinary skills in the art to recognize that the image enhancement server 130 and the work station 150 may correspond to the same computing device. It may also be possible that some or all of the functionalities supported by the image enhancement server 130 and the workstation 150 are implemented as a part of the medical imaging device 110.

In some embodiments, the processor(s) 131 of the image enhancement server 130 may include central processing units (CPUs) for controlling the overall operation of the image enhancement server 130. The processor(s) 131 may accomplish this by executing software or firmware stored in memory 132. The processor(s) 131 may be or may include, one or more programmable general-purpose or special-purpose microprocessors, digital signal processors (DSPs), programmable controllers, application specific integrated circuits (ASICs), programmable logic devices (PLDs), graphical processing units (GPUs) or the like, or a combination of such devices. The memory 132 may represent any form of random access memory (RAM), read-only memory (ROM), flash memory (as discussed above), or the like, or a combination of such devices. In use, the memory 132 may contain, among other things, a set of machine readable instructions which, when executed by the processor 131, causing the processor 131 to perform at least some embodiments of the present disclosure.

In some embodiments, the workstation 150 may be a computer device with sufficient resources (e.g., graphics cards, memory, hard-drive, fast network connectivity, and others) to perform multi-dimensional image rendering and display the rendered phase-correlated images 140. The workstation 150 may also be installed with visualization software and tools for advanced editing and processing of the phase-correlated images 140. The details of the projections 120, the image enhancement server 130, and the phase-correlated images 140 are further described below.

Figure 2:
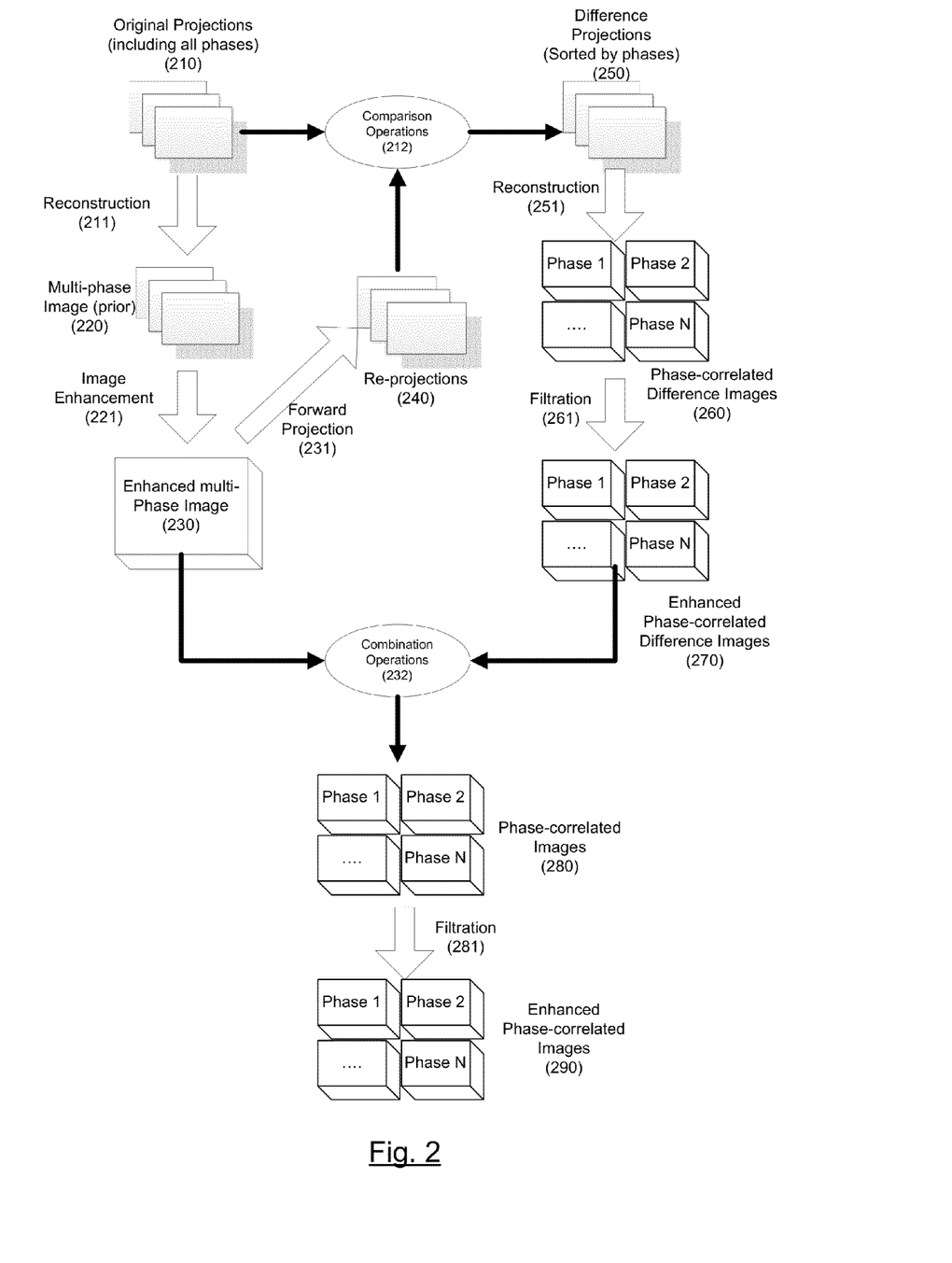
FIG. 2 shows a process flow illustrating embodiments of generating and enhancing one or more phase-correlated images.

FIG. 2 shows a process flow illustrating embodiments of generating and enhancing one or more phase-correlated images. In FIG. 2, a set of original projections 210 may be obtained from a medical imaging device such as the medical imaging device 110 of FIG. 1. The original projections 210 may contain computed tomography (CT) data obtained in multiple motion phases (e.g., multiple respiratory, cardiovascular, or muscular phases). The original projections 210 may then be processed by an image enhancement server such as the image enhancement server 130 of FIG. 1.

In some embodiments, a reconstruction operation 211 employing a filtered-back-projection algorithm, such as the Feldkamp, Davis, and Kress (FDK) algorithm, may be utilized to generate a multi-phase image 220 from the original projections 210. When the multi-phase image 220, which may also be referred to as a "prior" image, is generated from a sufficient number of the original projections 210, this prior image may include the blurred boundaries of moving organs, such as a heart or a lung, and a time-averaged signal for the moving tissues. On the other hand, when there is an insufficient number of the original projections 210, or when there are inconsistencies in the original projections 210, various artifacts, such as motion-induced streaks, may be present in the reconstructed multi-phase image 220.

In some embodiments, an image enhancement operation 221 may be utilized to process the multi-phase image 220 to generate an enhanced multi-phase image 230. The image enhancement operation 221 may reduce or remove the artifacts from the multi-phase image 220. By using the enhanced multi-phase image 230, instead of the multi-phase image 220, the rest of the illustrated reconstruction and processing operations in FIG. 2 may yield substantially improved results.

One example image enhancement operation 221 may use a motion extraction approach to estimate the positions and intensities of the streaks in the prior image 220 and subtract these streaks from the prior image 220. Another example image enhancement operation 221 may utilize a filtering approach. When streaks may be viewed as correlated noise superimposed on the prior image 220, image restoration techniques, such as linear or nonlinear filtering, may be applied to reduce the streaks' intensities. Yet another example image enhancement operation 221 may adapt a segmentation approach, in which a segmentation mechanism may separate the prior image 220 into multiple segments by structure, and the streaking artifacts may then be practically removed from the prior image 220. The details of the aforementioned example image enhancement operations are further described below.

In some embodiments, the enhanced multi-phase image 230 may be forward-projected (231) to generate a set of re-projections 240. The re-projections 240 may be generated using the same configurations that are utilized by the medical imaging device for generating the original projections 210. For example, the image enhancement server may simulate the projection acquisition operations (e.g., the forward-projection operation 231) on the multi-phase image 230 based on the same scanning angles and exposure periods of the medical imaging device to generate the estimated re-projections 240. In other words, the original projections 210 are measured based on a physical structure (e.g., a patient's body), while the re-projections 240 are estimated based on a virtual structure in the enhanced multi-phase image 230.

In some embodiments, the re-projections 240 and the original projections 210 may have the same number of projection frames and cover the same number of motion phases. Further, each of the re-projections 240 may correspond to each of the original projections 210 (e.g., generated in the same motion phase, from the same angle, and other configuration parameters) and thus may be meaningfully compared with one another.

In some embodiments, the original projections 210 and the re-projections 240 may be processed by one or more comparison operations 212 to generate a set of difference projections 250. For example, each original projection 210 and its corresponding re-projection 240 may be compared for differences. The resulting difference projection 250 may show no difference in some areas, indicating lack of motion in these areas during the acquisition of the original projections 210. Areas in the difference projection 250 that show significant differences, on the other hand, indicate locations of motion during the collection of the original projections 210.

In some embodiments, the difference projections 250 may then be sorted by motion phases, and a reconstruction operation 251 may be performed to generate a set of phase-correlated difference images 260 from the difference projections 250. The difference projections 250 that belong to a certain inspiration or expiration phase may be used in the reconstruction operation 251, which may be similar to the reconstruction operation 211, to reconstruct a difference image 260. For example, assuming there are 600 original projections 210 collected during 5 inspiration phases and 5 expiration phases. The forward-projection operation 231 may generate 600 re-projections 240 corresponding to the 600 original projections 210. Subsequently, the comparison operations 212 may result in 600 difference projections 250, which may be sorted in the order of the 5 inspiration and 5 expiration phases. The sorted difference projections 250 may then be relied upon to reconstruct 10 phase-correlated difference images 260, including 5 inspiration-phase difference images and 5 expiration-phase difference images.

In some embodiments, the image enhancement operation 221 may reduce motion-induced noise from the multi-phase image 220, but may introduce noise in the areas of the multi-phase images 220 that represent stationary tissues. The introduced noise may be present in the phase-correlated difference images 260. In this case, a filtration operation 261 may be applied to the phase-correlated difference images 260 to generate a set of enhanced phase-correlated difference images 270. The filtration operation 261 may utilize a linear or non-linear spatial filtering approach to filter each of the phase-correlated difference images 260 in order to reduce noise and random fluctuations in the phase-correlated difference images 260. Alternatively, the phase-correlated difference images 260 may be filtered using an adaptive temporal filtering approach to reduce noise for pixels where no motion is present. Further, the phase-correlated difference images 260 may be filtered using both the spatial filtering approach as well as the temporal filtering approach.

In some embodiments, the image enhancement server may perform one or more combination operations 232 with the multi-phase image 230 and the enhanced phase-correlated difference images 270 to generate a set of phase-correlated images 280. As an example, each of the enhanced phase-correlated difference images 270 may be subtracted from the multi-phase image 230 to generate one of the phase-correlated images 280.

Optionally, a filtration operation 281 may be applied to the phase-correlated images 280 to generate a set of enhanced phase-correlated images 290. The filtration operation 281 may utilize similar filtering approaches as the filtration operation 261. Alternatively, the filtration operation 261 may be optional, and the combination operations 232 may be applied to the phase-correlated difference images 260 (in lieu of the enhanced phase-correlated differences images 270) in generating the phase-correlated images 280. Then, the filtration operation 281 may be applied to the phase-correlated images 280. The details of using linear or nonlinear spatial filtering or adaptive temporal filtering approaches on the phase-correlated difference images 260 and/or the phase-correlated images 280 are further described below.

Figure 3:
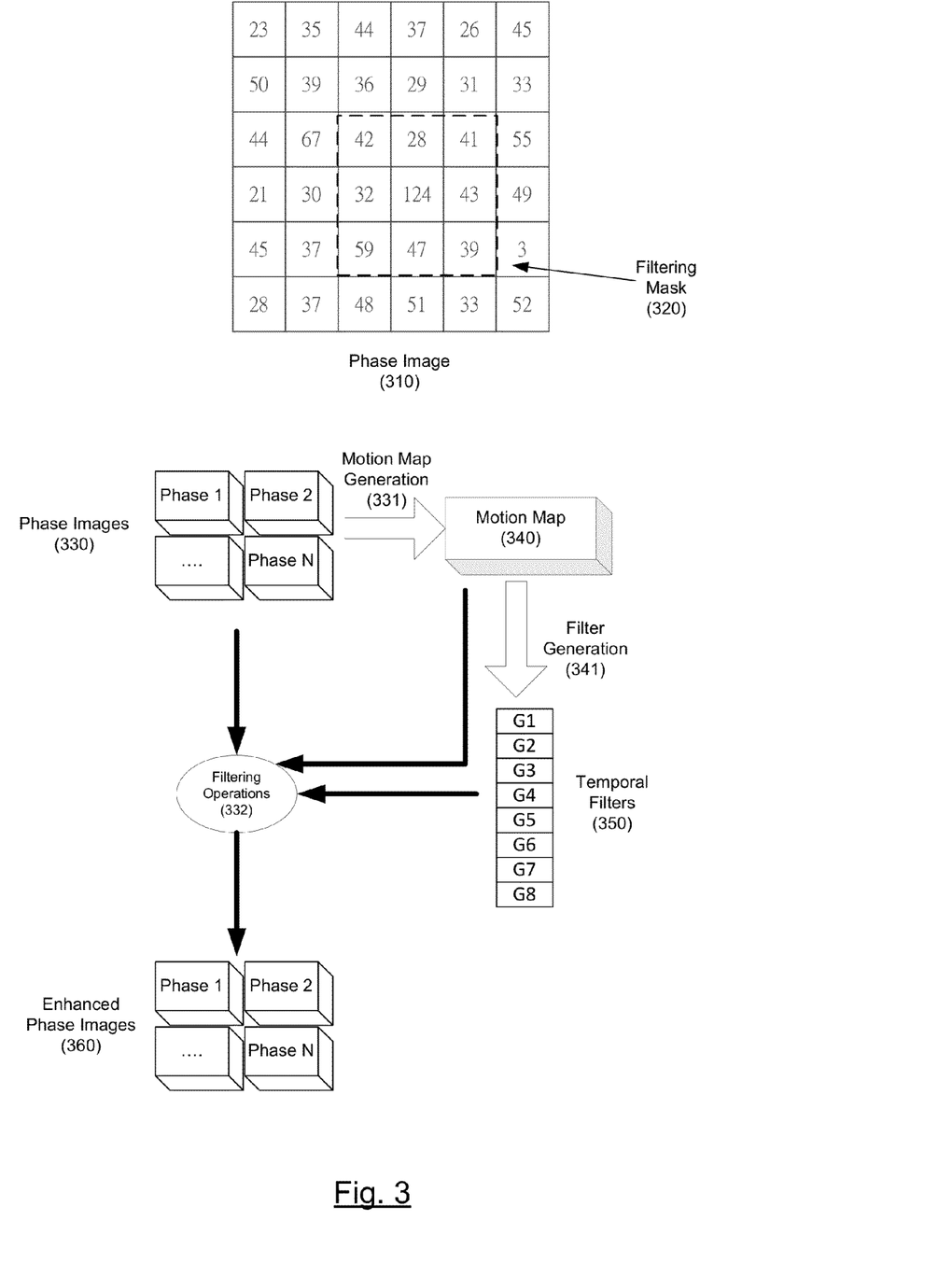
FIG. 3 shows scenarios illustrating embodiments of the spatial filtering approach and the adaptive temporal filtering approach in enhancing phase-correlated images.

FIG. 3 shows a flow diagram illustrating embodiments of the spatial filtering approach and the adaptive temporal filtering approach in enhancing phase-correlated images. As described above, spatial filtering and adaptive temporal filtering may be utilized to reduce noise in the difference images and/or the phase-correlated images. The spatial filtering approach may utilize a spatial filter 320 to filter a phase image 310 (which, for example, may be one phase of image that is selected from the phase-correlated difference images 260 or the phase-correlated images 280 of FIG. 2). Phase images 330 (similar to the phase-correlated difference images 260 or the phase-correlated images 280 of FIG. 2) may be filtered using adaptive temporal filtering approach to generate enhanced phase images 360 (similar to the enhanced phase-correlated difference images 270 or the enhanced phase-correlated images 290 of FIG. 2).

The phase image 310 may contain artifacts that are introduced during, for example, the image enhancement operation 221 of FIG. 2. The phase image 310 may be filtered using a linear or nonlinear spatial filtering approach. Spatial filtering may refer to a filtering process that is performed directly on the pixels of an image. In some embodiments, the filtering process may include moving a filtering mask covering a size of M×N pixels from one part of the image to another and applying arithmetic or statistic calculations based on the pixels covered by the filtering mask. A linear spatial filtering may utilize arithmetic functions such as, without limitation, mean, min, max, count, sum, variety, or range for data processing. A non-linear spatial filtering may adopt statistic functions such as, without limitation, median, variance, standard deviation, coefficient of variation, or inter-quartile range.

In some embodiments, the spatial filtering process may utilize a median filter in evaluating a pixel based on the neighbouring pixels in the phase image 310. The pixel under evaluation may be positioned at the center of the filtering mask ("center pixel"), with additional pixels surrounding the center pixel ("surrounding pixels"). For example, the exemplary phase image 310 shown in FIG. 3 may represent a phase of image having 6×6, or 36, pixels. The spatial filtering process may include defining an N×N filtering mask 320 (e.g., N can be an integer number from 3 to 9, and 3 is used as an illustration in FIG. 3) and processing the pixels in the phase image 310 one at a time by moving the filtering mask 320 across the phase image 310. For each center pixel covered by the filtering mask 320, the filtering process may evaluate its pixel value and the pixel values of the surrounding pixels. When the filtering process determines that the center pixel's value is abnormal comparing to the surrounding pixels, the filtering process may adjust the pixel value of the center pixel by calculating a median value based on all the pixels covered in the filtering mask 320.

To illustrate, the filtering process may detect that the value of the center pixel in the filter mask 320 is "124" (which is high relative to the surrounding 8 other pixel values), indicating the center pixel may be contaminated by noise. The filtering process may determine a median value using the 9 pixels in the filtering mask 320. Using the example pixel values shown in FIG. 3, the medium value may be "42." The filtering process may then replace the center pixel's pixel value "124" with the new median value "42." Thus, by using a median filter, the noise detected in the phase image 310 may be smoothed or removed.

In some embodiments, the phase image 310 may be a three-dimensional image. In this case, the filtering process may utilize a N×N×N median filter, where N may be an integer number from 3 to 9. For example, a 3×3×3 filtering mask may be defined to filter the pixels in the phase image 310 by evaluating the 27 pixels covered in the filtering mask. Alternatively, the filtering process may utilize an M×N filtering mask, with M and N being any integer numbers that are larger than 2. Further, the linear or nonlinear filters utilized by the filtering process may include, without limitation, bilateral filters or non-local means filters. The bilateral filters and the non-local means filters may be edge-preserving and noise-reduction smoothing filters that filter pixel values using weighted average of the surrounding pixels values.

Once all phase images 330 are available, in some embodiments, a temporal filtering approach may be utilized to reduce noise in these phase images 330, without affecting spatial resolution. Specifically, a filtering operation may be configured to be adaptive depending on the amount of "motion" a certain pixel may experience in these phase images 330.

In some embodiments, a pixel in one of the phase images 330 may be denoted as Pixel(X,p), with X representing the 3D spatial position of the pixel in the specific image, and p denotes the specific phase of the specific image. The adaptive spatial-temporal filter may be denoted as G(X,p). Thus, the filtering operation may be represented by the following formula:

FilteredPixel(X,p)=G(X,p)*Pixel(X,p), where * denotes a (multi-dimensional) convolution operation. Note that G may be nonstationary and adaptive in space and/or time.

For cases when the phase images 330 are phase-correlated difference images (260) then, after Pixel(X,p) is filtered, the result is added to the Enhanced Multi-Phase Image (230) using the following equation:

FinalPixel(X,p)=Enhanced Multi-Phase Image(X,p)+ w×FilteredPixel(X,p), where w is a weighting factor ranging between 0 and 1. When the prior image has been enhanced (e.g., de-streaked and/or segmented), then the weighting variable w may be set to 1, and the temporal component of the adaptive filter G may be weighted based on motion associated with the phase images 330.

In some embodiments, the adaptive filter G may be adjusted based on the amount of motion associated with a specific pixel Pixel(X,p) in the phase images 330. The amount of motion may be determined from a 3-D motion map 340, which may be generated in a motion map generation operation 331 based on the phase images 330. For each of the pixel positions in the phase images 330, there is a corresponding motion value in the 3-D motion map 340. The motion value, which may range from 0 to 1, with 0 representing stationary, and 1 representing maximum motion.

In some embodiments, the motion map generation operation 331 may first load all the phase images 330 into memory, with one image for each phase. For a specific pixel position, the pixel intensity values located at the specific pixel position in the phase images 330 may be collected and evaluated in order to determine the temporal standard deviation StdDev of a pixel. A low StdDev value may indicate that there is less or no motion. A high StdDev value may show that the pixel intensity values are widely distributed, which may indicate the presence of motion. The StdDev value may then be divided by a high standard deviation threshold (StdDevThreshHigh), which may be a pre-determined constant value. Thus, the motion value "M" for the specific pixel position may be calculated based on the following formula:

$$M = StdDev/StdDevThreshHigh.$$

In some embodiments, the value of the StdDevThreshHigh may be set to 150 HU (Hounsfield Units). Further, different StdDevThreshHigh values may be adopted for different lung patients based on histogram analysis. The StdDevThreshHigh value may also depend on the number of phases reconstructed. Using the above formula, if the calculated M value is above 1, then the M value may be clipped to 1. After all the pixel positions are processed, the M values for the pixel positions in the phase images 330 may be stored in the motion map 340.

In some embodiments, based on the motion map 340, a filter generation operation 341 may set up an array of temporal filters 350 for subsequent filtering operations. The number of temporal filters 350 may equal to the number of phases nPhase. The length of each filter may also be nPhase. The filter may offer a progressively increasing amount of temporal filtration based on the amount of motion.

For example, a reconstruction consisting of 8 temporal phases (nPhase=8) may be processed by the following set of temporal filters 350:

```
G1 = [ 1   0   0   0   0   0   0   0   ]/1
G2 = [ 1   0.5 0   0   0   0   0   0.5 ]/2
G3 = [ 1   1   0   0   0   0   0   1   ]/3
G4 = [ 1   1   0.5 0   0   0   0.5 1   ]/4
G5 = [ 1   1   1   0   0   0   1   1   ]/5
G6 = [ 1   1   1   0.5 0   0.5 1   1   ]/6
G7 = [ 1   1   1   1   0   1   1   1   ]/7
G8 = [ 1   1   1   1   0.5 1   1   1   ]/7.5
```

The filters are applied using circular convolution. For example, Filter G8 temporally smoothes the data more than G7 which smoothes the data more than G6 etc. Filter G1 preserves the original data In some embodiments, a filtering operation 332 may be applied to process the phase images 330 based on the temporal filters 350 and the motion map 340. The filtering operation 332 may include selecting a pixel from one of the phase images 330, retrieving a motion value M that is associated with the pixel from the motion map 340, and choosing a temporal filter from the temporal filters 350 based on the M value. The appropriate temporal filter may be selected using the following equation:

$$i = \text{round}((n\text{Phase}+1-\text{round}(M*n\text{Phase}))/2);$$

if (I<1) then I-=1,
i indicating the specific temporal filter to be selected. Based on the above equation, the less motion value M, the higher the i value may be.

In some embodiments, after a proper temporal filter is selected, the filtering operation 332 may include performing a circular convolution on the pixel under filtration. Specifically, the filtration of the pixel Pixel(X,p) may be performed based on the following equation:

$$FilteredPixel(X, p) = \sum_{q=1}^{nPhase} \text{Pixel}(X, p)G(i, (p-q+1)_{nPhase})$$

Thus, the above adaptive temporal filtering approach may fine-tune its filtering operation by using various temporal filters $G(i,(p-q+1)_{nPhase})$ that are selected based on the motion detected in the phase images 330. The outputs of the above equation are filtered pixels, which may be stored as the enhanced phase images 360.

Figure 4:
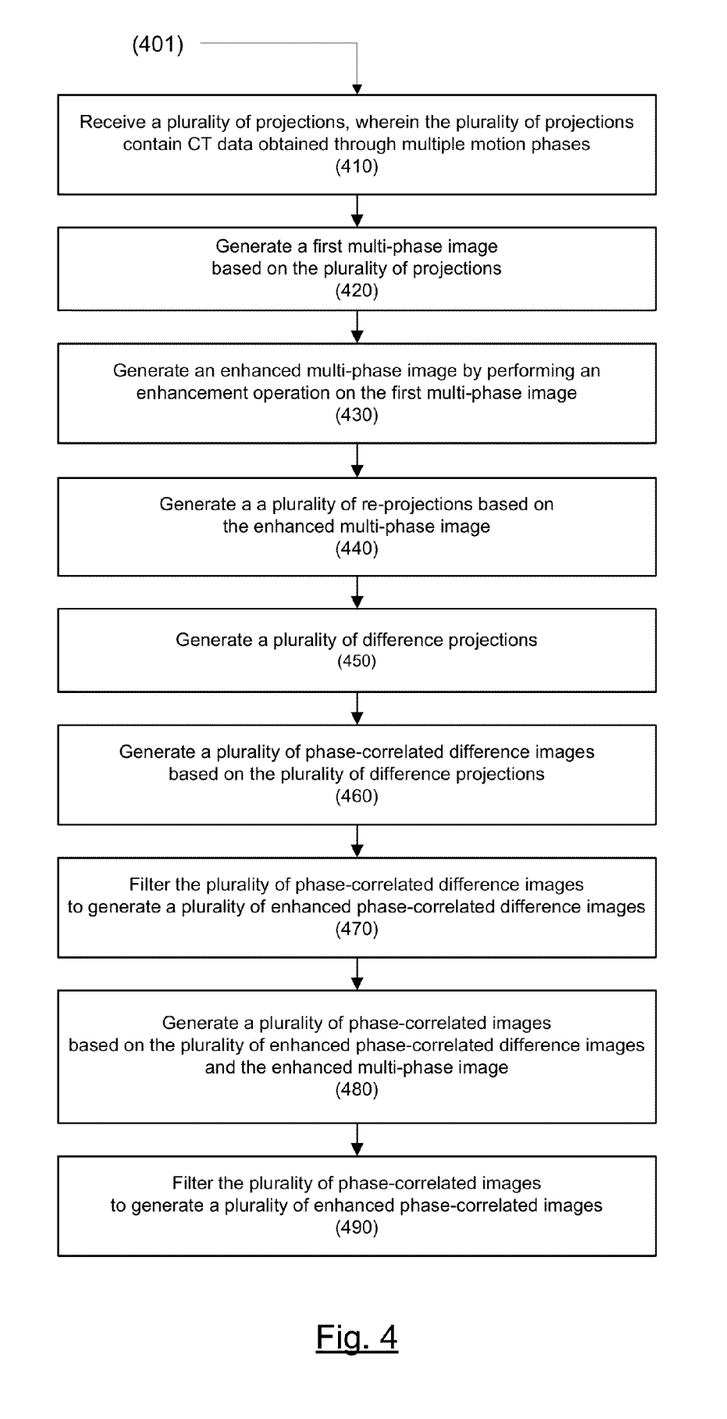
FIG. 4 shows a flow diagram illustrating one embodiment of a process for generating and enhancing one or more phase-correlated images.

FIG. 4 shows a flow diagram illustrating one embodiment of a process 401 for generating and enhancing one or more phase-correlated images. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 410, a medical imaging device may acquire a plurality of projections from a patient's body. The plurality of projections may contain CT data obtained through multiple motion phases. The following descriptions will use respiratory phases as example motion phases for illustrative purposes.

At block 420, an image enhancement server may receive the plurality of projections and process the plurality of projections to generate a first multi-phase image (also referred to as a prior image). The image enhancement server may back-project each of the plurality of projections to generate a model structure and combine the model structures into the first multi-phase image. The plurality of projections are associated with multiple respiratory phases.

At block 430, the image enhancement server may perform one or more enhancement operations on the first multi-phase image and generate an enhanced multi-phase image. Some example enhancement operations, as discussed in detail above, include, without limitation, a motion extraction approach, a filtering approach, and a segmentation approach.

At block 440, the image enhancement server may forward-project the enhanced multi-phase image and generate a plurality of re-projections. The plurality of re-projections may correspond to the plurality of projections.

At block 450, the plurality of re-projections may be compared with the plurality of original projections for generating a plurality of difference projections. Specifically, each projection selected from the plurality of original projections may be compared with a corresponding re-projection selected from the plurality of re-projections.

At block 460, the plurality of difference projections may be sorted by respiratory phase. The image enhancement server may back-project the difference projections belonging to a specific respiratory phase to generate a difference image. Thus, the plurality of difference projections may be used to generate a plurality of phase-correlated difference images.

At block 470, a filtering process may be optionally applied to the phase-correlated difference images. As described above, the filtering process may include utilizing linear or nonlinear spatial filtering and/or temporal filtering approaches to generate a plurality of enhanced phase-correlated difference images.

At block 480, the plurality of enhanced phase-correlated difference images may be used with the enhanced multi-phase image to create a plurality of phase-correlated images, which have motion-induced streaks reduced or removed.

At block 490, a second filtering process may be optionally applied to the phase-correlated images. The filtering process may also include utilizing a linear or nonlinear spatial and temporal filtering approaches to generate a plurality of enhanced phase-correlated images.

Figure 5:
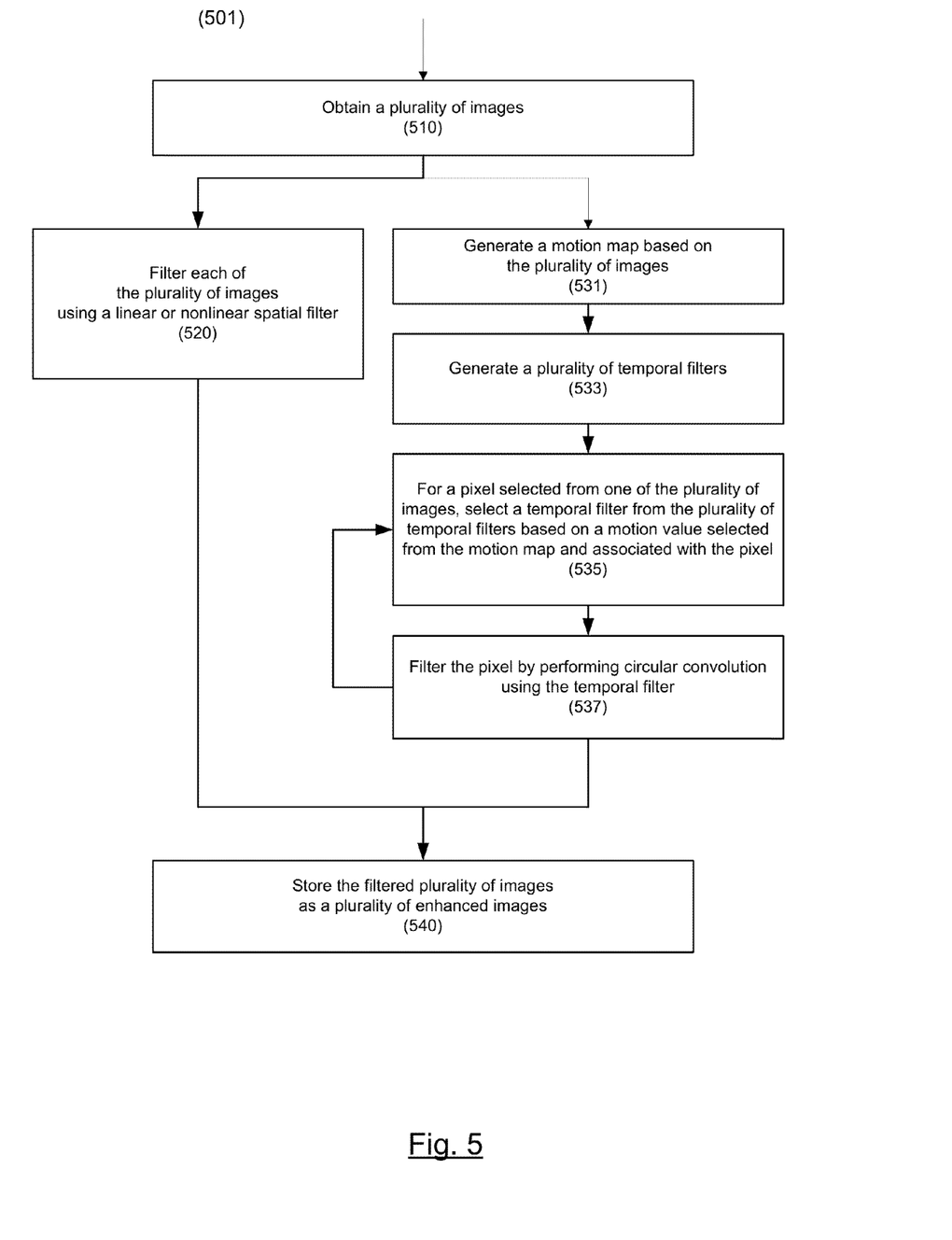
FIG. 5 shows a flow diagram illustrating one embodiment of a process for enhancing a set of images using the spatial filtering approach and the temporal filtering approach.

FIG. 5 shows a flow diagram illustrating one embodiment of a process 501 for enhancing a set of images using the spatial filtering and the temporal filtering approach. The process 501 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

At block 510, an image enhancement server may generate a plurality of images. The plurality of images may be a plurality of phase-correlated difference images or a plurality of phase-correlated images. If a linear or nonlinear spatial filtering approach to filter the plurality of images is chosen, then the process 501 proceeds to block 520. On the other hand, if an adaptive temporal filtering approach is chosen, then the process 501 proceeds to block 531. Alternatively, the image enhancement server may process the plurality of images using both the linear or nonlinear spatial filtering approach and the adaptive temporal filtering approach. In this case, process 501 may proceed to block 520 and subsequently to block 531.

At block 520, the image enhancement server may filter each of the plurality of images using a linear or nonlinear spatial filter. In addition, the image enhancement server may receive the plurality of images one at a time, and filter the plurality of images by the order they are received.

At block 531, the image enhancement server may proceed once all the plurality of images are obtained. The image enhancement server may generate a motion map based on the plurality of images. The motion map may contain motion values associated with the pixels in the plurality of images. The motion values may indicate whether the associated pixels represent stationary tissues or moving tissues.

At block 533, the image enhancement server may generate a plurality of temporal filters. The plurality of temporal filters may provide heavy filtrations for stationary tissues, and light filtrations for moving tissues.

At block 537, for a pixel selected from one of the plurality of images, the image enhancement server may select a temporal filter from the plurality of temporal filters based on a motion value that is selected from the motion map and is associated with the pixel. The motion value indicates the amount of motion at a specific pixel position as derived from the plurality of images, and the selected temporal filter may be suitable for filtering the specific pixel based on the motion value.

At block 537, the image enhancement server may perform circular convolution using the temporal filter operating on pixels that are located at the same spatial position in the plurality of images. Upon complete filtration, the process 501 may proceed to block 535 to process another pixel selected from one of the plurality of images. After one of the plurality of images is filtered, the image enhancement server may select another one of the plurality of images for processing. Once all pixels from the plurality of images are filtered, the process 501 may proceed to block, 540.

At block 540, the filtered plurality of images may be deemed a plurality of enhanced images, and may be used subsequently as described in FIG. 4.

Thus, methods and systems for performing medical imaging enhancement have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory machine-readable storage medium and may be executed by one or more general-purpose or special-purpose programmable processors. For example, the machine-executable instructions for the process 401 and the process 501 may be stored in memory, executed by a processor, and/or implemented in an image enhancement server, such as the image enhancing server 130 of FIG. 1, a medical imaging device, such as the medical imaging device 110 of FIG. 1, or other imaging enhancement systems. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non-recordable media (e.g., read-only memory (ROM), random access memory (RAM), magnetic disk storage media, optical storage media, flash memory devices, etc.)

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. A method to enhance a motion-blurred image, comprising:
    generating a prior image based on a plurality of projections, wherein the plurality of projections are computed tomography (CT) images obtained in multiple motion phases;
    performing an enhancement operation based on the prior image to reduce motion-induced artifacts in the prior image to generate an enhanced prior image;
    generating a plurality of re-projections by forward-projecting the enhanced prior image;
    generating a plurality of phase-correlated difference images based on the plurality of projections and the plurality of re-projections;
    filtering the plurality of phase-correlated difference images to generate a plurality of filtered phase-correlated difference images; and
    generating a plurality of phase-correlated images based on the plurality of filtered phase-correlated difference images and the enhanced prior image.

2. The method as recited in claim 1, wherein the filtering of the plurality of phase-correlated difference images further comprises:
    applying a spatial filter to each of the plurality of phase-correlated difference images.

3. The method as recited in claim 2, wherein the spatial filter is an N×N or N×N×N median filter, and N is an integer number from 3 to 9.

4. The method as recited in claim 1, wherein the filtering of the plurality of phase-correlated difference images further comprises:
    applying an adaptive temporal filter to each of the plurality of phase-correlated difference images.

5. The method as recited in claim 4, wherein a temporal component of the adaptive temporal filter is weighted based on motions associated with the plurality of phase-correlated difference images.

6. The method as recited in claim 5, wherein the operations of applying the adaptive temporal filter further comprises:
    generating a motion map based on the plurality of phase-correlated difference images; and
    applying the adaptive temporal filter to a pixel selected from the plurality of phase-correlated difference images, wherein the adaptive temporal filter is determined based on a motion value that is associated with the pixel and selected from the motion map.

7. The method as recited in claim 6, wherein the generating of the motion map further comprises:
    determining a standard deviation value based on pixels from each of the plurality of phase-correlated difference images that are located at a specific pixel position; and
    calculating a motion value for the specific pixel position based on the standard deviation value.

8. The method as recited in claim 6, wherein the adaptive temporal filter is selected from an array of adaptive temporal filters that are generated based on the motion map.

9. The method as recited in claim 1, wherein the filtering of the plurality of phase-correlated difference images further comprises:
    applying a linear or nonlinear spatial filter to each of the plurality of phase-correlated difference images; and
    applying an adaptive temporal filter to each of the plurality of phase-correlated difference images.

10. The method as recited in claim 9, where the linear or nonlinear spatial filter and the adaptive temporal filter have a form of bilateral filter or non-local means filter.

11. The method as recited in claim 1, further comprising:
    filtering the plurality of phase-correlated images to generate a plurality of enhanced phase-correlated images.

12. A method to enhance a motion-blurred image, comprising:
    generating a prior image based on a plurality of projections, wherein the plurality of projections are computed tomography (CT) images obtained in multiple motion phases;
    performing an enhancement operation based on the prior image to reduce motion-induced artifacts in the prior image to generate an enhanced prior image;
    generating a plurality of re-projections by forward-projecting the enhanced prior image;
    generating a plurality of phase-correlated difference images based on the plurality of projections and the plurality of re-projections;
    generating a plurality of phase-correlated images based on the plurality of phase-correlated difference images and the enhanced prior image; and
    filtering the plurality of phase-correlated images to generate a plurality of filtered phase-correlated images.

13. The method as recited in claim 12, wherein the filtering of the plurality of phase-correlated images further comprises:
    applying a linear or nonlinear spatial filter to each of the plurality of phase-correlated images.

14. The method as recited in claim 13, wherein the filtering of the plurality of phase-correlated images further comprises:
    applying a spatial-temporal filter to each of the plurality of phase-correlated images.

15. The method as recited in claim 12, wherein the filtering of the plurality of phase-correlated images further comprises:
    applying an adaptive temporal filter to each of the plurality of phase-correlated images.

16. A machine-readable medium having a set of instructions which, in response to execution by a processor, cause the processor to perform a method to enhance a motion-blurred image, the method comprising:
    generating a prior image based on a plurality of projections, wherein the plurality of projections are computed tomography (CT) images obtained in multiple motion phases;
    performing an enhancement operation based on the prior image to reduce motion-induced artifacts in the prior image to generate an enhanced prior image;
    generating a plurality of re-projections by forward-projecting the enhanced prior image;

generating a plurality of phase-correlated difference images based on the plurality of projections and the plurality of re-projections;

filtering the plurality of phase-correlated difference images to reduce noise introduced during the enhancement operation to generate a plurality of filtered phase-correlated difference images; and generating a plurality of phase-correlated images based on the plurality of filtered phase-correlated difference images and the enhanced prior image.

17. The machine-readable medium as recited in claim 16, wherein the filtering of the plurality of phase-correlated difference images further comprises:

applying an adaptive temporal filter to each of the plurality of phase-correlated difference images.

18. A machine-readable medium having a set of instructions which, in response to execution by a processor, cause the processor to perform a method to enhance a motion-blurred image, the method comprising:

generating a prior image based on a plurality of projections, wherein the plurality of projections are computed tomography (CT) images obtained in multiple motion phases;

performing an enhancement operation based on the prior image to reduce motion-induced artifacts in the prior image to generate an enhanced prior image;

generating a plurality of re-projections by forward-projecting the enhanced prior image;

generating a plurality of phase-correlated difference images based on the plurality of projections and the plurality of re-projections;

generating a plurality of phase-correlated images based on the plurality of phase-correlated difference images and the enhanced prior image; and filtering the plurality of phase-correlated images to generate a plurality of filtered phase-correlated images.

19. The machine-readable medium as recited in claim 18, wherein the filtering of the plurality of phase-correlated images further comprises:

applying an adaptive temporal filter to each of the plurality of phase-correlated images.

* * * * *